United States Patent [19]

Nakai

[11] Patent Number: 5,766,507
[45] Date of Patent: Jun. 16, 1998

[54] LIQUID-CRYSTAL RESIN COMPOSITION FOR MOLDING APPLICATIONS HAVING IMPROVED FLUIDITY AND SATISFACTORY THERMAL STABILITY

[75] Inventor: Mikio Nakai, Shizuoka, Japan

[73] Assignee: Polyplastics Co., Ltd., Osaka, Japan

[21] Appl. No.: 938,721

[22] Filed: Dec. 10, 1991

Related U.S. Application Data

[63] Continuation of Ser. No. 435,993, Nov. 14, 1989, abandoned.

[30] Foreign Application Priority Data

Dec. 27, 1988 [JP] Japan ................... 63-330129

[51] Int. Cl.$^6$ ............... C09K 19/52; C09K 19/32
[52] U.S. Cl. ................. 252/299.01; 252/299.62
[58] Field of Search ............. 252/299.01, 299.62

[56] References Cited

U.S. PATENT DOCUMENTS

| | | | |
|---|---|---|---|
| 4,161,470 | 7/1979 | Calundann | 252/299.01 |
| 4,184,996 | 1/1980 | Calundann | 252/299.01 |
| 4,330,457 | 5/1982 | East et al. | 524/602 |
| 4,370,466 | 1/1983 | Siemionko | 528/190 |
| 4,539,386 | 9/1985 | Yoon | 528/183 |
| 4,581,399 | 4/1986 | Yoon | 524/246 |
| 4,617,371 | 10/1986 | Blumstein et al. | 252/299.01 |
| 4,786,709 | 11/1988 | Iimura et al. | 252/299.01 |
| 4,816,555 | 3/1989 | Hisgen et al. | 252/299.01 |
| 4,831,103 | 5/1989 | Kock | 252/299.01 |
| 4,843,140 | 6/1989 | Poll et al. | 252/299.01 |
| 4,861,515 | 8/1989 | Minamisawa et al. | 252/299.01 |
| 4,891,293 | 1/1990 | Sacripante et al. | 252/299.01 |
| 4,892,675 | 1/1990 | Nohira et al. | 252/299.01 |
| 4,952,334 | 8/1990 | Hakemi et al. | 252/299.01 |
| 5,132,390 | 7/1992 | Domszy et al. | 252/299.01 |

FOREIGN PATENT DOCUMENTS

| | | |
|---|---|---|
| 2158832 | 11/1985 | United Kingdom . |
| WO88/09802 | 12/1988 | WIPO . |

OTHER PUBLICATIONS

Wiley and Sons, Encyclopedia of Polymer Science and Engineering, 2nd Edition, vol. 12, pp. 49, 124 & 125 (1988).

*Primary Examiner*—Philip Tucker
*Attorney, Agent, or Firm*—Burns, Doane, Swecker & Mathis, L.L.P.

[57] ABSTRACT

A liquid-crystal polyester resin composition has an improved fluidity and comprises (a) melt-processable polyester (liquid-crystal polyester) having a weight-average molecular weight of about 10,000 to 200,000 and capability of forming an anisotropic melt phase upon being heated and (b) 1 to 100 parts by weight, based on 100 parts by weight of component (a), of a melt-processable polyester (liquid-crystal polyester) having a weight-average molecular weight of about 1,000 to 7,000 and capability of forming an anisotropic melt phase upon being heated.

10 Claims, No Drawings

LIQUID-CRYSTAL RESIN COMPOSITION FOR MOLDING APPLICATIONS HAVING IMPROVED FLUIDITY AND SATISFACTORY THERMAL STABILITY

This application is a continuation of application Ser. No. 435,993, filed Nov. 14, 1989, now abandoned.

In recent years, with expansion of applications of plastics, a demand has increased for a material having a combination of high rigidity, high thermal resistance and excellent chemical resistance with moldability. Various liquid-crystal polyesters have been proposed which are polymers exhibiting anisotropy when melted, as described by W. J. Jackson in Journal of Polymer Science, Polymer Chemistry Edition, Vol. 14, 2043 (1976).

It is a common practice in the art to incorporate various reinforcing agents and fillers in plastics for the purpose of improving the mechanical strengths of the plastics. However, incorporation of a large amount of the filler is often detrimental to desired characteristics of the resin such as weight reduction, chemical resistance, and moldability. In particular, the fluidity of the resin is inhibited during molding, and this hinders preparation of a molded article having a small thickness, a large dimension, or a complicated shape by injection molding, which brings about a limitation to the filler incorporation approach depending upon the shape of the intended molded article.

Since the liquid-crystal polyester exhibits fluidity much better than that of other resins, it is often used to prepare a molded article having a small thickness, a large dimension, or a complicated shape which is difficult to prepare from other resins. However, with a reduction in the size and weight of plastic products in recent years, there is a tendency to demand a molded article having higher mechanical properties, e.g., strength and rigidity. Incorporation of the inorganic filler is useful for improving and enhancing the mechanical properties but, as described above, such incorporation lowers the fluidity of the resin, which inhibits the injection molding of these molded articles, so that a further improvement has been desired for the liquid-crystal polyester.

In order to meet the above-described demand, two expedients, i.e., a rise of the molding temperature and use of a base polymer having a low degree of polymerization, have been adopted in the art as methods of improving the fluidity of the resin. However, the rise of the molding temperature unfavorably promotes a lowering in the properties of the resin due to thermal decomposition thereof. The latter method as well is detrimental to the original mechanical properties. In the prior art methods, it was difficult to prepare a molded article having a combination of a small thickness, a large dimension or a complicated shape with excellent mechanical strengths, which brought about a strong desire for a resin composition having excellent fluidity while maintaining excellent mechanical strengths.

SUMMARY OF THE INVENTION

The present inventors have made extensive and intensive studies in search of a method for improving the fluidity of a resin with a view to preparing a resin composition which can be easily and efficiently molded into a molded article having a small thickness, a large dimension or a complicated shape without detriment to excellent mechanical, thermal and electrical properties, flame retardancy, etc. of the liquid-crystal polyester resin, and as a result have found that a combination of a particular low molecular weight liquid-crystal polyester with a particular high-molecular weight liquid-crystal polyester enables the above-described object to be attained without substantial detriment to other properties, which has led to the completion of the present invention.

Accordingly, the present invention provides a liquid-crystal polyester resin composition having improved fluidity, characterized by comprising (a) a melt-processable polyester (liquid-crystal polyester) having a weight-average molecular weight of about 10,000 to 200,000 and capability of forming an anisotropic melt phase upon being heated and (b) 1 to 100 parts by weight, based on 100 parts by weight of component (a), of a melt-processable polyester (liquid-crystal polyester) having a weight-average molecular weight of about 1,000 to 7,000 and capability of forming an anisotropic melt phase upon being heated.

As will be described later, the liquid-crystal polyester used in the present invention is a material having high strength by virtue of a combination with a self-reinforcing effect derived from its unique molecular arrangement and being less susceptible to dimensional distortion by virtue of a low coefficient of linear expansion and a small molding shrinkage factor. Further, the liquid-crystal polyester has thermal resistance sufficient to withstand a temperature as high as 220° to 240° C., excellent chemical resistance, weather resistance and hot water resistance, very excellent chemical stability, and no adverse effect on the other materials.

The present invention aims at a further improvement in the fluidity of the liquid-crystal polyester while maintaining the above-described excellent characteristics thereof.

The base resin used in the present invention is a high-molecular weight liquid-crystal polyester as component (a) having a weight-average molecular weight of about 10,000 to 200,000, preferably about 10,000 to 25,000 from the viewpoint of mechanical properties and moldability.

When the weight-average molecular weight of the liquid-crystal polyester as component (a) is less than 10,000, the mechanical properties are poor, while a polymer having a weight-average molecular weight exceeding 200,000 is difficult to prepare.

In the present invention, a low-molecular weight liquid-crystal polyester as component (b) having a weight-average molecular weight of about 1,000 to 7,000, preferably about 1,000 to 4,000, is incorporated in the above-described high-molecular weight liquid-crystal polyester as component (a) in an amount of 1 to 100 parts by weight based on 100 parts by weight of component (a), thereby improving the fluidity of the composition.

When the molecular weight of the low-molecular weight liquid-crystal polyester as component (b) is less than 1,000, the mechanical properties and thermal stability become poor in the case of incorporation in an amount exceeding 10 parts by weight, while when the molecular weight exceeds 7,000, the effect of improving the fluidity, i.e., the object of the present invention, cannot be attained even when the proportion of component (b) is increased.

Further, the mixing ratio of component (a) to component (b) is also important and limited to 1 to 100 parts by weight of component (b) to 100 parts by weight of component (a). The proportion of component (b) is preferably 5 to 60 parts by weight, particularly preferably 10 to 40 parts by weight based on 100 parts by weight of component (a). When the proportion of component (b) is too low, scarcely any effect of improving the fluidity intended in the present invention can be attained. On the other hand, when the proportion of component (b) is too high, there occurs a remarkable lowering in the mechanical strengths etc.

In the components constituting the composition, components (a) and (b) may be the same or different in the kind as far as they are a liquid-crystal polyester which will be described later. However, it is preferred that they be of the same kind also from the viewpoint of miscibility between resins, homogeneity of the resin, etc..

The term "weight-average molecular weight" used in the present invention is intended to mean one measured by gel permeation chromatography (for particulars, see Examples which will be described later).

The term "liquid-crystal polyester" used in the present invention is intended to means a melt-processable polyester having such properties that the polymer molecular chains are regularly arranged parallel to each other in a molten state. The state in which molecules are arranged in this way is often called a liquid-crystal state or a nematic phase of a liquid-crystal material. Such polymer molecules are generally slender and flat and have substantial rigidity along the major axis of the molecule and a plurality of chain-lengthening bonds which are usually in either a coaxial relationship or a parallel relationship with each other.

The properties of the anisotropic molten phase may be confirmed by a customary polarimetric method using crossed nicols. More particularly, the anisotropic molten phase can be confirmed by observing a molten sample placed on a Leitz hot stage in a nitrogen atmosphere at a magnification of 40 under a Leitz polarization microscope. When the polymer of the present invention is placed between crossed nicols, it permits transmission of polarized light even in a static state, i.e., exhibits optical anisotropy.

Liquid-crystal polymers suitable for use in the present invention are substantially insoluble in general solvents, which renders the liquid-crystal polymers unsuitable for processing in solution. Instead, as already described above, these polymers can be easily processed by a usual melt processing method.

In general, the above-described liquid-crystal polyesters and polyester amides exhibit a logarithmic viscosity (I.V.) of about 3.5 to 12 dl/g in the case of the high-molecular liquid-crystal polyester (a) and about 0.3 to 3.0 dl/g in the case of the low-molecular liquid-crystal polyester as component (a) when dissolved in pentafluorophenol at 60° C. in a concentration of 0.1 % by weight.

The components of the polymer which forms the anisotropic molten phase as described above are those selected from the group consisting of:

① at least one member selected from the group consisting of aromatic dicarboxylic acids and alicyclic dicarboxylic acids;

② at least one member selected from the group consisting of aromatic diols and alicyclic diols;

③ at least one member selected from the group consisting of aromatic hydroxy carboxylic acids;

④ at least one member selected from the group consisting of aromatic thiocarboxylic acids;

⑤ at least one member selected from the group consisting of aromatic thiol phenols;

⑥ at least one member selected from the group consisting of aromatic hydroxy amines and aromatic diamines; and the like. The polymer which forms the anisotropic melt phase is a polyester capable of forming an anisotropic melt phase and is comprised of a combination of components such as:

I) a polyester mainly composed of components ① and ②;

II) a polyester mainly composed of component ③ only;

III) a polyester mainly composed of components ①, ②, and ③;

IV) a polythiol-ester mainly composed of component ④;

V) a polythiol-ester mainly composed of components ① and ⑤;

VI) a polythiol-ester mainly composed of components ①, ④, and ⑤;

VII) a polyester-amide mainly composed of components ①, ③, and ⑥;

VIII) a polyester-amide mainly composed of components ①, ②, ③, and ⑥. Any of them may contain an aliphatic diol as far as they function as a liquid crystal.

Aromatic polyazomethines are also a polymer which forms an anisotropic melt phase, although they are not included in the category of the above-described combinations of components. Particular examples of such aromatic polyazomethines include poly(nitrilo-2-methyl-1,4-phenylenenitriloethylidyne-1,4-phenyleneethylidyne); poly(nitrilo-2-methyl-1,4-phenylenenitrilomethylidyne-1,4-phenylenemethylidyne; and poly(nitrilo-2-chloro-1,4-phenylenenitrilomethylidyne-1,4-phenylenemethylidyne).

Also polyester carbonates are a polymer which forms an anisotropic melt phase, although they are not included in the category of the above-described combinations of components. They are composed essentially of 4-oxybenzoyl, dioxyphenyl, dioxycarbonyl, and terephthaloyl units.

Polymers capable of forming an anisotropic melt phase particularly suitable for use in the present invention are those mainly composed of the above-described aromatic polyesters I, II, and III and polyester amide VIII. They may be produced by various esterification processes wherein organic monomer compounds having functional groups capable of forming the required repetitive units through condensation are mutually reacted.

Examples of the compounds constituting the above-described polymers include naphthalene compounds such as 2,6-naphthalenedicarboxylic acid, 2,6-dihydroxynaphthalene, 1,4-dihydroxynaphthalene, and 6-hydroxy-2-naphthoic acid, biphenyl compounds such as 4,4'-biphenyldicarboxylic acid and 4,4'- dihydroxybiphenyl, compounds represented by the following general formulae (I), (II), or (III):

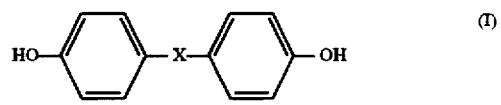

(I)

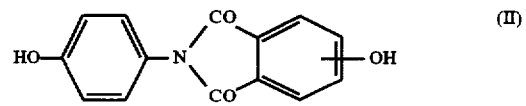

(II)

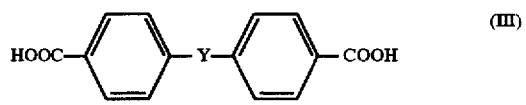

(III)

wherein X is a group selected from among an alkylene group ($C_1$-$C_4$), an alkylidene group, —O—, —SO—, —SO$_2$—, —S—, and —CO; and Y is a group selected from among —(CH$_2$)n—wherein n is 1 to 4 and —O(CH$_2$)$_n$O—wherein n is 1 to 4; p-substituted benzene compounds such as p-hydroxybenzoic acid, terephthalic acid, hydroquinone, p-aminophenol, and p-phenylenediamine and ring-substituted compounds thereof (wherein the substituent is selected from among chlorine, bromine, methyl, phenyl, and 1-phenylethyl); and m-substituted benzene compounds such as isophthalic acid and resorcinol.

Further, the liquid-crystal polyester used in the present invention may be a polyester partially containing a polyalkylene terephthalate unit which does not exhibit any anisotropic melt phase in the same molecular chain besides the above-described components. In this case, the alkyl group has 2 to 4 carbon atoms.

Among the polymers composed of the above-described components, those containing at least one member selected from among naphthalene compounds, biphenyl compounds, and p-substituted benzene compounds as essential component are preferred. Among the p-substituted benzene compounds, p-hydrobenzoic acid, methylhydroquinone, and 1-phenylethylhydroquinone are particularly preferred.

Specific examples of the compounds which are components in the above-described polymers I to VIII and specific examples of polyesters capable of forming an anisotropic melt phase and suitable for use in the present invention are described in Japanese Patent Laid-Open No. 69866/1986.

Further, the polyester of the present invention may contain other thermoplastic resins as an auxiliary additive in such an amount as will not spoil the purpose of the present invention.

There is no particular limitation on the thermoplastic resin used in this case, and examples thereof include polyolefins such as polyethylene and polypropylene, an aromatic polyester comprising an aromatic dicaroboxylic acid and a diol, such as polyethylene terephthalate or polybutylene terephthalate, or a hydroxy carboxylic acid, polyacetal (homopolymer or copolymer), polystyrene, polyvinyl chloride, polyamide, polycarbonate, ABS, polyphenylene oxide, polyphenylene sulfide, and fluororesin. These thermoplastic resins may be used in the form of a mixture of two or more of them.

It is possible and preferred to incorporate an inorganic filler in the liquid-crystal polyester used in the present invention without detriment to the fluidity of the polyester.

The inorganic filler is a known component usually added to a liquid-crystal polyester for the purpose of improving various mechanical and physical properties, such as strength, rigidity and hardness, thermal resistance and various electrical properties, and may be used in any form such as that of fibers, flakes and particles, depending upon the intended end use.

Examples of the fibrous filler include inorganic fibrous materials such as fibers of glass, asbestos, silica, silica-alumina, alumina, zirconia, boron nitride, silicon nitride, boron, and potassium titanate.

Examples of the particulate fillers include carbon black, graphite, silica, quartz powder, glass beads, milled glass fiber, glass balloons, glass powder, silicates such as calcium silicate, aluminum silicate, kaolin, talc, clay, diatomaceous earth and wollastonite, metallic oxides such as iron oxide, titanium oxide, zinc oxide, antimony trioxide and alumina, metal salts of carbonic acid such as calcium carbonate and magnesium carbonate, metal salts of sulfuric acid such as calcium sulfate and barium sulfate, and other fillers such as ferrite, silicon carbide, silicon nitride and boron nitride.

Examples of a flaky inorganic material include mica and glass flake.

These inorganic and organic fillers may be used alone or in a combination of two or more of them.

The inorganic filler is incorporated in an amount of 1 to 80% by weight, preferably 10 to 60% by weight based on the total amount of the composition.

In the present invention, the inorganic filler may be used in combination with a known surface treatment depending upon the desired properties. Examples of compounds used during the surface treatment include functional compounds such as epoxy compounds, isocyanate compounds, titanate compounds, and silane compounds. These compounds may be used by during a preliminary surface treatment, or alternatively may be added simultaneously during the preparation of the filled material.

Further, additives known in the art, e.g., lubricants, nucleating agents, dyes and pigments, mold releasing agents, antioxidants, thermal stabilizers, weather (light) stabilizers, reinforcements, and hydrolysis stabilizers may be added to the resin composition of the present invention for the purpose of imparting desired characteristics depending upon the end use purposes.

The resin composition of the present invention can be prepared by an ordinary method employed in the art. Specifically, necessary components are mixed with each other, and the mixture is melted and kneaded with a single-screw or twin-screw extruder or other melt-mixer. In this case, part of the components, e.g., an inorganic filler, may be added and incorporated later.

The present invention relates to a liquid-crystal polyester resin composition having improved fluidity and comprising the above-described components. In the present invention, addition of a small amount of a low-molecular weight liquid-crystal polyester provides excellent fluidity and does not cause any lowering in the properties, such as a rise of the molding temperature and a lowering in the molecular weight, as compared to the prior art. Further, since the fluidity is improved even in the presence of an inorganic filler, the liquid-crystal polyester composition of the present invention can find a very wide field of applicability and is very advantageously used particularly for injection molding of an article having a small thickness, a large dimension or a complicated shape which cannot be injection molded in the case of other resins.

[EXAMPLE]

The present invention will now be described with reference to the following Examples which should not be construed as limiting the present invention.

The properties in the Examples were measured by the following methods.

1) Method of measuring weight-average molecular weight:

A gel permeation chromatograph comprising a liquid feed pump, a sample injector, a high-temperature thermostat and a separatory column, a differential refractive index detector (DRI), a low-angle laser beam scattering photometer, a personal computer for control data processing, etc. was used in this measurement. About 150 µl of a 0.1 wt. % polymer solution of a liquid-crystal polyester pellet in pentafluorophenol was introduced into the above-described apparatus uniformly set at 60° C., separated with a polystyrene gel filter by taking advantage of a difference in the molecular weight, and subjected to data processing through DRI for measurement.

2) Method of measuring fluidity (bar flow length):

Pellets of the composition of the present invention were molded into a particular test piece (a size of 5 mm in width×0.5 mm in thickness) by making use of a molding machine set under the following conditions and a particular mold for a thin bar flow test, and the fluidity was evaluated from the flow length (packed resin length).

cylinder temperature: 300° C.
injection pressure: 700 kg/cm$^2$
mold temperature: 120° C.

3) Method of measuring properties:
Tensile test: according to ASTM D-638
Bending test: according to ASTM D-790
Thermal deformation temperature: according to ASTM D-648

Liquid-crystal polyesters used in the Examples were respectively those composed of the following structural units:
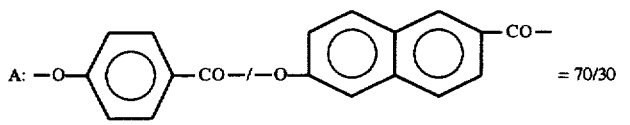 = 70/30
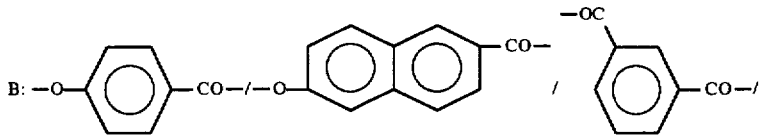 = 60/20/10/10
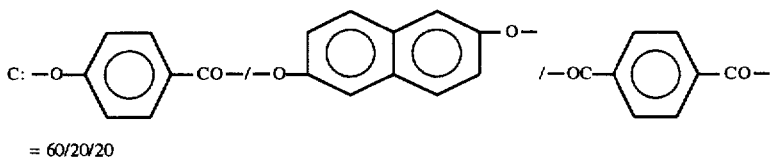 = 60/20/20
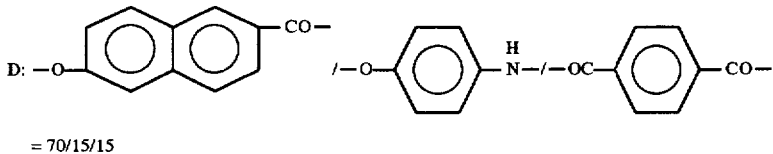 = 70/15/15
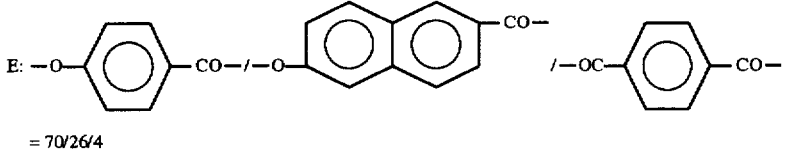 = 70/26/4
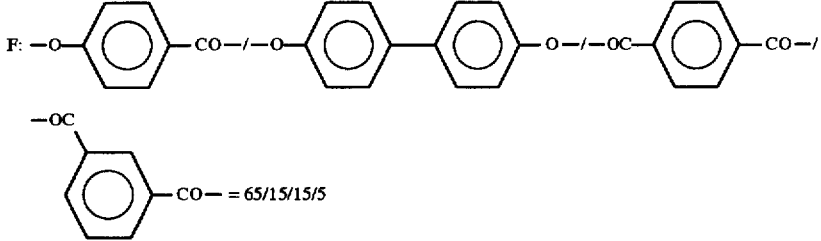 = 65/15/15/5
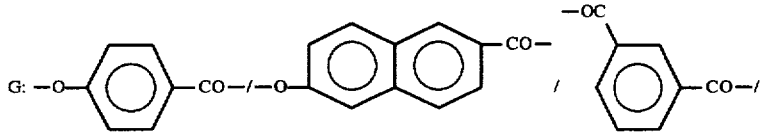 = 35/5/30/30
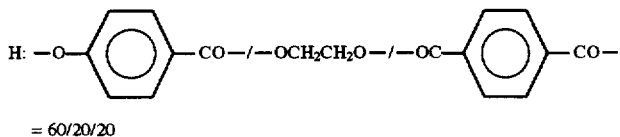 = 60/20/20
(The numeral represents the molar ratio.)

Examples 1 to 8

Each of high-molecular weight liquid-crystal polyester resins having a weight-average molecular weight of about 25,000 as component (a) (8 kinds of resins, i.e., resins A to H which will be described later) was mixed with 20 parts by weight, based on 100 parts by weight of the polymer, of a low-molecular weight liquid-crystal polyester having a weight-average molecular weight of about 3,500 as component (b) (resin A which will be described later). Each polymer mixture, a glass fiber, and a milled fiber were mixed with each other in respective amounts of 50% by weight, 30% by weight and 20% by weight based on the total amount of the composition. The mixture was pelletized with a conventional extruder at 280° C. according to a customary method and then subjected to the above-described fluidity test. Separately, another test piece was molded to evaluate the mechanical properties. The results are shown in Table 1.

Comparative Examples 1 to 6

Each of the high-molecular weight liquid-crystal polyester resins having a weight-average molecular weight of about 25,000 as component (a) (6 kinds of resins, i.e., resins A to E and H which will be described later) was mixed with 50% by weight of a polymer, 30% by weight of a glass fiber, and 20% by weight of a milled fiber. The mixture was pelletized with a conventional extruder at 280° C. according to a customary method and then subjected to the above-described fluidity test. Separately, another test piece was molded to evaluate the mechanical properties. The results are shown in Table 2.

Examples 9 to 15

Each of the high-molecular weight liquid-crystal polyester resins having a weight-average molecular weight of about 25,000 as component (a) (resins A and B which will be described later) were mixed with each of the low-molecular weight liquid-crystal polyesters having a weight-average molecular weight of about 3,500 as component (b) (resins A to E which will be described later) in proportions based on 100 parts by weight of the polymer shown in Table 3. 70% by weight of each polymer mixture was mixed with 30% by weight of a glass fiber. The mixture was pelletized with a conventional extruder at 280° C. according to a customary method and then subjected to the above-described fluidity test. Separately, another test piece was molded to evaluate the mechanical properties. The results are shown in Table 3.

Comparative Examples 7 and 8

Each of high-molecular weight liquid-crystal polyester resins having a weight-average molecular weight of about 25,000 as component (a) (resins A and B which will be described later) was mixed with 70% by weight of a polymer and 30% by weight of a glass fiber. The mixture was pelletized with a usual extruder at 280° C. according to a customary method and then subjected to the above-described fluidity test. Separately, another test piece was molded to evaluate the mechanical properties. The results are shown in Table 3.

Examples 16 to 19

A high-molecular weight liquid-crystal polyester resin having a weight-average molecular weight of about 135,000 as component (a) (resins B which will be described later) was mixed with each of the low-molecular weight liquid-crystal polyesters respectively having weight-average molecular weights of about 3,500 and 7,000 as component (b) (resins A and B which will be described later) in proportions shown in Table 4, pelletized with a conventional extruder at 280° C. according to a customary method without addition of any inorganic filler and then subjected to the above-described fluidity test. Separately, another test piece was molded to evaluate the mechanical properties. The results are shown in Table 4.

Comparative Examples 9 to 11

A liquid-crystal polyester resin having a varied weight-average molecular weight (resin B which will be described later) was pelletized as such with a conventional extruder at 280° C. according to a customary method and then subjected to the above-described fluidity test. Separately, another test piece was molded to evaluate the mechanical properties. The results are shown in Table 5.

TABLE 1

| | Ex. 1 | Ex. 2 | Ex. 3 | Ex. 4 | Ex. 5 | Ex. 6 | Ex. 7 | Ex. 8 |
|---|---|---|---|---|---|---|---|---|
| polymer ratio | | | | | | | | |
| liquid-crystal polyester (pts. wt.) | A | B | C | D | E | F | G | H |
| (MW = 25000) | 100.0 | 100.0 | 100.0 | 100.0 | 100.0 | 100.0 | 100.0 | 100.0 |
| liquid-crystal polyester (pts. wt.) | A | A | A | A | A | A | A | A |
| (MW = 3500) | 20.0 | 20.0 | 20.0 | 20.0 | 20.0 | 20.0 | 20.0 | 20.0 |
| composition | | | | | | | | |
| aforesaid polymer mixture (wt. %) | 50.0 | 50.0 | 50.0 | 50.0 | 50.0 | 50.0 | 50.0 | 50.0 |
| glass fiber (wt. %) | 30.0 | 30.0 | 30.0 | 30.0 | 30.0 | 30.0 | 30.0 | 30.0 |
| milled fiber (wt. %) | 20.0 | 20.0 | 20.0 | 20.0 | 20.0 | 20.0 | 20.0 | 20.0 |
| properties | | | | | | | | |
| tensile strength (kg/cm$^2$) | 1426 | 1406 | 1410 | 1401 | 1417 | 1404 | 1351 | 970 |
| tensile elongation (%) | 1.4 | 1.3 | 1.4 | 1.3 | 1.4 | 1.3 | 1.2 | 2.3 |
| bending strength (kg/cm$^2$) | 1840 | 1790 | 1760 | 1880 | 1820 | 1690 | 1670 | 1500 |
| modulus in flexure (kg/cm$^2$) | 15.1 × 10$^4$ | 14.9 × 10$^4$ | 14.8 × 10$^4$ | 15.7 × 10$^4$ | 15.0 × 10$^4$ | 14.3 × 10$^4$ | 14.5 × 10$^4$ | 14.3 × 10$^4$ |
| thermal deform. temp. (°C.) 18.6 kg/cm$^2$ | 221 | 241 | 230 | 220 | 223 | 231 | 229 | 198 |
| flow length (mm) | 33 | 34 | 32 | 35 | 36 | 31 | 34 | 28 |

TABLE 2

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| composition |  |  |  |  |  |  |
| liquid-crystal polyester (wt. %) (MW = 25000) | A 50.0 | B 50.0 | C 50.0 | D 50.0 | E 50.0 | H 50.0 |
| glass fiber (wt. %) | 30.0 | 30.0 | 30.0 | 30.0 | 30.0 | 30.0 |
| milled fiber (wt. %) | 20.0 | 20.0 | 20.0 | 20.0 | 20.0 | 20.0 |
| properties |  |  |  |  |  |  |
| tensile strength (kg/cm$^2$) | 1431 | 1414 | 1421 | 1419 | 1417 | 1050 |
| tensile elongation (%) | 1.4 | 1.3 | 1.4 | 1.3 | 1.4 | 2.8 |
| bending strength (kg/cm$^2$) | 1845 | 1829 | 1780 | 1910 | 1834 | 1590 |
| modulus in flexure (kg/cm$^2$) | $15.1 \times 10^4$ | $15.0 \times 10^4$ | $14.9 \times 10^4$ | $15.7 \times 10^4$ | $15.2 \times 10^4$ | $14.8 \times 10^4$ |
| thermal deform. temp. (°C.) 18.6 kg/cm$^2$ | 224 | 243 | 231 | 223 | 228 | 210 |
| flow length (mm) | 10 | 11 | 10 | 11 | 12 | 9.7 |

TABLE 3

|  | Ex. 9 | Ex. 10 | Ex. 11 | Ex. 12 | Ex. 13 | Ex. 14 | Ex. 15 | Comp. Ex. 7 | Comp. Ex. 8 |
|---|---|---|---|---|---|---|---|---|---|
| polymer ratio |  |  |  |  |  |  |  |  |  |
| liquid-crystal polyester (pts. wt.) (MW = 25000) | A 100.0 | A 100.0 | A 100.0 | A 100.0 | A 100.0 | A 100.0 | B 100.0 | A 100.0 | B 100.0 |
| liquid-crystal polyester (pts. wt.) (MW = 3500) | A 40.0 | B 40.0 | C 40.0 | D 40.0 | E 40.0 | A 70.0 | A 40.0 | — | — |
| composition |  |  |  |  |  |  |  |  |  |
| aforesaid polymer mixture (wt. %) | 70.0 | 70.0 | 70.0 | 70.0 | 70.0 | 70.0 | 70.0 | 70.0 | 70.0 |
| glass fiber (wt. %) | 30.0 | 30.0 | 30.0 | 30.0 | 30.0 | 30.0 | 30.0 | 30.0 | 30.0 |
| properties |  |  |  |  |  |  |  |  |  |
| tensile strength (kg/cm$^2$) | 1860 | 1790 | 1820 | 1841 | 1835 | 1100 | 1841 | 2150 | 1850 |
| tensile elongation (%) | 2.2 | 2.1 | 2.1 | 2.2 | 2.0 | 1.0 | 2.0 | 2.2 | 2.0 |
| bending strength (kg/cm$^2$) | 2438 | 2450 | 2422 | 2498 | 2460 | 1980 | 1850 | 2550 | 2400 |
| modulus in flexure (kg/cm$^2$) | $14.7 \times 10^4$ | $14.9 \times 10^4$ | $15.0 \times 10^4$ | $14.9 \times 10^4$ | $14.9 \times 10^4$ | $14.2 \times 10^4$ | $14.6 \times 10^4$ | $15.0 \times 10^4$ | $14.8 \times 10^4$ |
| thermal deform. temp. (°C.) 18.6 kg/cm$^2$ | 229 | 229 | 228 | 230 | 229 | 210 | 228 | 230 | 240 |
| flow length (mm) | 41 | 39 | 37 | 38 | 39 | 46 | 41 | 15 | 22 |

TABLE 4

|  | Ex. 16 | Ex. 17 | Ex. 18 | Ex. 19 |
|---|---|---|---|---|
| polymer ratio |  |  |  |  |
| liquid-crystal polyester (pts. wt.) (MW = 135000) | B 85.0 | B 85.0 | B 85.0 | B 85.0 |
| liquid-crystal polyester (pts. wt.) (MW = 7000) | — | — | A 15.0 | B 15.0 |
| liquid-crystal polyester (pts. wt.) (MW = 3500) | A 15.0 | B 15.0 | — | — |
| properties |  |  |  |  |
| tensile strength (kg/cm$^2$) | 1690 | 1680 | 1800 | 1700 |
| tensile elongation (%) | 3.6 | 3.6 | 4.0 | 4.0 |
| bending strength (kg/cm$^2$) | 1650 | 1680 | 1800 | 1800 |
| modulus in flexure (kg/cm$^2$) | $6.6 \times 10^4$ | $6.2 \times 10^4$ | $6.2 \times 10^4$ | $5.8 \times 10^4$ |
| thermal deform. temp. (°C.) 18.6 kg/cm$^2$ | 218 | 219 | 224 | 223 |
| flow length (mm) | 70 | 71 | 58 | 57 |

TABLE 5

|  | Comp. Ex. 9 | Comp. Ex. 10 | Comp. Ex. 11 |
|---|---|---|---|
| polymer ratio |  |  |  |
| liquid-crystal polyester (pts. wt.) (MW = 135000) | B 100.0 | — | — |
| liquid-crystal polyester (pts. wt.) (MW = 7000) | — | B 100.0 | — |
| liquid-crystal polyester (pts. wt.) (MW = 3500) | — | — | B 100.0 |
| properties |  |  |  |
| tensile strength (kg/cm$^2$) | 1840 | 1500 | 570 |
| tensile elongation (%) | 4.2 | 2.5 | 0.6 |
| bending strength (kg/cm$^2$) | 1870 | 1600 | 844 |
| modulus in flexure (kg/cm$^2$) | $6.5 \times 10^4$ | $9.0 \times 10^4$ | $8.0 \times 10^4$ |
| thermal deform. temp. (°C.) 18.6 kg/cm$^2$ | 223 | 210 | 177 |
| flow length (mm) | 46 | 71 | 87 |

I claim:

1. A liquid-crystal polyester resin composition having improved fluidity as well as a good retention of mechanical properties in molded articles formed therefrom, consisting essentially of a substantially uniform admixture of pre-formed polymers (a) and (b) formed in the molten state in which each exhibits a substantially distinct molecular weight and wherein (a) is a melt-processable polyester which is capable of forming an anisotropic melt phase having a weight-average molecular weight of about 10,000 to 200,000 and a logarithmic viscosity of 3.5 to 12 dl./g. when dissolved in pentafluorophenol at 60° C. in a concentration of 0.1% by weight, and (b) in excess of 10 up to 40 parts by weight, based on 100 parts by weight of component (a), of a melt-processable polyester which is capable of forming an anisotropic melt phase having a weight-average molecular weight of about 1,000 to 7,000 and a logarithmic viscosity of 0.3 to 3.0 dL/g. when dissolved in pentafluorophenol at 60° C. in a concentration of 0.1% by weight.

2. A liquid-crystal polyester composition according to claim 1, which further comprises an inorganic filler in an amount of 1 to 80% by weight based on the total amount of the composition.

3. A liquid-crystal polyester composition according to claim 1, which further comprises an inorganic filler in an amount of 10 to 60% by weight based on the total amount of the composition.

4. A liquid-crystal polyester composition according to claim 1, wherein said component (a) has a weight-average molecular weight of about 10,000 to 25,000.

5. A liquid-crystal polyester composition according to claim 1, wherein component (b) has a weight-average molecular of about 1,000 to 4,000.

6. A liquid-crystal polyester composition according to claim 1, wherein said component (a) has a weight average molecular weight of about 10,000 to 25,000 and said component (b) has a weight-average molecular weight of about 1,000 to 4,000.

7. A liquid-crystal polyester composition according to claim 1, wherein said component (a) has a weight average molecular weight of about 25,000 and said component (b) has a weight average molecular weight of about 3,500.

8. A liquid-crystal polyester composition according to claim 1, wherein said components (a) and (b) are chemically the same.

9. A liquid-crystal polyester composition according to claim 1, wherein components (a) and (b) each contain recurring naphthalene moieties.

10. A liquid-crystal polyester composition according to claim 1, wherein components (a) and (b) each contain about 70 mole % of recurring 4-oxybenzoyl moieties and approximately 30 mole % of recurring 6-oxy-2-naphthoyl moieties.

* * * * *